United States Patent
Lunghi et al.

(10) Patent No.: US 11,023,566 B2
(45) Date of Patent: Jun. 1, 2021

(54) ELECTRONIC DEVICE INCLUDING A DIGITAL CIRCUIT FOR ACCESSING ENCRYPTED DATA IN A MEMORY AND CORRESPONDING METHOD TO ACCESS ENCRYPTED DATA IN A MEMORY

(71) Applicants: STMicroelectronics S.r.l., Agrate Brianza (IT); STMicroelectronics (Rousset) SAS, Rousset (FR)

(72) Inventors: Stefano Lunghi, Azzate (IT); Albert Martinez, Bouc Bel Air (FR)

(73) Assignees: STMICROELECTRONICS S.R.L., Agrate Brianza (IT); STMICROELECTRONICS (ROUSSET) SAS, Rousset (FR)

( * ) Notice: Subject to any disclaimer, the term of this patent is extended or adjusted under 35 U.S.C. 154(b) by 147 days.

(21) Appl. No.: 16/150,810

(22) Filed: Oct. 3, 2018

(65) Prior Publication Data
US 2019/0114400 A1 Apr. 18, 2019

(30) Foreign Application Priority Data
Oct. 12, 2017 (IT) .............................. 1020170115266

(51) Int. Cl.
*H04L 29/00* (2006.01)
*G06F 21/12* (2013.01)
(Continued)

(52) U.S. Cl.
CPC ........ *G06F 21/121* (2013.01); *G06F 9/44573* (2013.01); *G06F 12/1408* (2013.01);
(Continued)

(58) Field of Classification Search
CPC ...... G06F 12/1408; G06F 21/71; G06F 21/79; G06F 21/85; G06F 2221/2105;
(Continued)

(56) References Cited

U.S. PATENT DOCUMENTS

| 2006/0195832 A1* | 8/2006 | Chandley | .................. G06F 8/36 |
| | | | 717/168 |
| 2013/0117577 A1* | 5/2013 | Hars | ....................... G06F 21/85 |
| | | | 713/190 |

(Continued)

*Primary Examiner* — Ghazal B Shehni
(74) *Attorney, Agent, or Firm* — Slater Matsil, LLP

(57) ABSTRACT

An electronic device includes: a non-volatile memory configured to store data including encrypted data; and a digital circuit. The digital circuit includes: a microprocessor configured to access the non-volatile memory and an internal memory; and a decryption circuit arranged on an interconnect network identifying an internal data path for exchanging the data between the non-volatile memory and the microprocessor, and connected to a memory controller of the non-volatile memory for receiving blocks of data from the non-volatile memory, the decryption circuit being configured to: perform a decryption on the fly of blocks of the data read from the non-volatile memory to obtain read decrypted data; generate first decryption masks corresponding to first blocks of data being read from the non-volatile memory at a given read address; and generate second decryption masks corresponding to second blocks of data to be read from the non-volatile memory at a next estimated read address.

22 Claims, 5 Drawing Sheets

(51) Int. Cl.
*G06F 12/14* (2006.01)
*G06F 21/72* (2013.01)
*G06F 21/79* (2013.01)
*G06F 9/445* (2018.01)
*G06F 21/14* (2013.01)
*G06F 21/60* (2013.01)
*G06F 21/74* (2013.01)
*H04L 9/06* (2006.01)

(52) U.S. Cl.
CPC .......... *G06F 21/14* (2013.01); *G06F 21/602* (2013.01); *G06F 21/72* (2013.01); *G06F 21/74* (2013.01); *G06F 21/79* (2013.01); *H04L 9/0631* (2013.01); *G06F 2212/1016* (2013.01); *G06F 2212/1052* (2013.01); *G06F 2212/402* (2013.01); *H04L 2209/04* (2013.01)

(58) Field of Classification Search
CPC .. G06F 12/0292; G06F 12/0802; G06F 12/14; G06F 21/121; G06F 21/74; G06F 21/14; G06F 21/602; G06F 21/72; G06F 9/44573; G06F 2212/1016; G06F 2212/1052; G06F 2212/402; H04L 2463/061; H04L 9/0631; H04L 2209/04
See application file for complete search history.

(56) References Cited

U.S. PATENT DOCUMENTS

2013/0129086 A1* 5/2013 Tang .................. H04L 63/0435
380/44
2015/0363334 A1 12/2015 Mundra et al.
2016/0182223 A1 6/2016 Kishinevsky et al.

* cited by examiner

ELECTRONIC DEVICE INCLUDING A DIGITAL CIRCUIT FOR ACCESSING ENCRYPTED DATA IN A MEMORY AND CORRESPONDING METHOD TO ACCESS ENCRYPTED DATA IN A MEMORY

CROSS-REFERENCE TO RELATED APPLICATIONS

This application claims priority to Italian Patent Application No. 102017000115266, filed on Oct. 12, 2017, which application is hereby incorporated herein by reference.

TECHNICAL FIELD

Various embodiments of the present description relate to an electronic device including a digital circuit including a circuit, in particular a microprocessor, to access a non-volatile memory, an internal memory, in particular a RAM, and a non-volatile memory, in particular a flash memory, for storing data, in particular read only data, from the non-volatile memory, the data being stored encrypted in the non-volatile memory.

BACKGROUND

In order to guarantee security, it is known to provide the application code image run by a microcontroller in an encrypted format to both protect the code image itself from a reverse engineering and deny the execution of unauthorized code image. For instance, a strong encryption algorithm like Advanced Encryption Standard (AES) ensures a high level of protection. However the decryption adds penalties to microprocessor performance.

The algorithm described by AES is a symmetric-key algorithm, meaning the same key is used for both encrypting and decrypting the data. AES is based on a design principle known as a substitution-permutation network, a combination of both substitution and permutation, and is fast in both software and hardware implementation. At present, there is no known practical attack that would allow someone without knowledge of the key to read data encrypted by AES when correctly implemented. However, the generation of the AES-based decryption masks is demanding in term of time and computation: a dedicated hardware circuit is needed to minimize the mask generation time without requiring the intervention of the microprocessor (microprocessor off-loading).

To this regard in FIG. 1 is described a typical subsystem without security capability, including a microcontroller 11 which includes a microprocessor 12, which in its turn includes a cache memory 13 to access a RAM memory of the microcontroller 11, not shown in FIG. 1. An interconnect network 14, which can include a bus, allows exchanging data and signals, for instance block of data B, with peripherals, such as a non-volatile memory, specifically an external flash memory 16, which is accessed for writing and reading blocks B through a memory controller 16a. Such memory controller 16a is decryption unaware, i.e. it is not configured to decrypt encrypted blocks of data. With the reference 15 is indicated a set of other peripherals inside the microcontroller 12 which are accessed through the interconnect network 14 by the microprocessor 11.

As shown, the microprocessor 12 can access block of data B in the external memory 16 through a path including the interconnect network 14 and the controller 16a, i.e. is a circuit to access the non-volatile memory 16. Since a microprocessor like microprocessor 12 (with its cache controller 13 enabled) typically reads block of data at a time (tens of bytes), if such blocks of data are encrypted, to decrypt them on the fly it would be necessary to be able to decrypt an entire block of data by applying the decryption masks to the encrypted block of data. The known memory controllers are decryption-unaware. However, memory controller redesign is complicated and would compromise their maturity. Further, the state-of-the-art flash devices supports hybrid wrap burst (block of data) read accesses: the first burst read access occurs with latency whereas the following burst accesses (when the address increments linearly) occurs without latency. A similar behavior occurs with the pre-fetch capability being implemented by the memory controllers to minimize the latency for consecutive read accesses to the flash device. The flash zero-latency implies that the decryption masks have to be generated very quickly.

SUMMARY

An object of one or more embodiments is to provide an electronic device includes a microprocessor based digital circuit that solves the drawbacks of the prior art and in particular provides a flexible architectural topology and easy design integration.

According to one or more embodiments, the object is achieved by an electronic device having the characteristics described herein. One or more embodiments may refer to a corresponding method as well as to a computer program product that can be loaded into the memory of at least one computer and includes parts of software code that are able to execute the steps of the method when the product is run on at least one computer. As used herein, reference to such a computer program product is understood as being equivalent to reference to a computer-readable medium containing instructions for controlling the processing system in order to co-ordinate implementation of the method according to the embodiments. Reference to "at least one computer" is evidently intended to highlight the possibility of the present embodiments being implemented in modular and/or distributed form.

According to the solution described herein, it is described an electronic device including a digital circuit, including a circuit, in particular a microprocessor, to access a non-volatile memory, an internal memory, in particular a RAM, and a non-volatile memory, in particular a flash memory, for storing data, in particular read only data, from the non-volatile memory, the data being encrypted and stored in the non-volatile memory, wherein the digital circuit includes a decryption circuit configured to perform a decryption on the fly of blocks of data read from the non-volatile memory stored encrypted in the non-volatile memory to obtain read decrypted data, the decryption circuit being arranged interposed on a interconnect network identifying a data path for exchanging data between the non-volatile memory and the circuit to access a non-volatile memory, and connected to a memory controller of the non-volatile memory for receiving the blocks of data read from the non-volatile memory corresponding to the data stored encrypted. The decryption circuit may be configured to generate decryption masks corresponding to the blocks of data being read from the non-volatile memory at a given read address and to generate decryption masks corresponding to second blocks of data read from the non-volatile memory at a next estimated read address.

In variant embodiments, the digital microcontroller is a microprocessor based digital circuit, in particular a digital microcontroller, preferably an ARM-based microcontroller, including a microprocessor, an internal memory, in particular a RAM, and a non-volatile memory, in particular a flash memory, for storing data including a user application code image, the microcontroller being configured to operate according to an execution flow, in particular an eXecution-In-Place (XIP) flow, including the microprocessor fetching instructions of the user application code image from the non-volatile memory and executing the instructions, the instructions of the user application code image being stored encrypted in the non-volatile memory, the digital circuit including the decryption circuit configured to perform a decryption on the fly of blocks of data read from the non-volatile memory corresponding to the instructions stored encrypted in the non-volatile memory to obtain read decrypted instructions, the decryption circuit being arranged interposed on the interconnect network identifying a data path for exchanging data between the non-volatile memory and the microcontroller, and connected to a memory controller of the non-volatile memory for receiving the blocks of data read from the non-volatile memory corresponding to the instructions stored encrypted.

In variant embodiments, the digital microcontroller includes a security subsystem circuit, in particular a Hardware Security Module, connected to a security interconnect network identifying a secure data path to exchange security information including encryption parameters with circuits of the microcontroller, the decryption circuit being also connected to the security subsystem circuit being connected to the security interconnect network to receive encryption parameters.

In variant embodiments, the decryption circuit includes an internal control path for exchanging the secure information with an internal decryption circuit, separated from an internal data path for exchanging data between the controller and the non-volatile memory.

In variant embodiments, the control path includes registers connected through interfaces to the security interconnect network, the registers being accessible via a dedicated port to which the security subsystem circuit is connected through the security interconnect network to manage the security of data transiting on the dedicated port, the registers being both write-only and write-once and the microcontroller, the registers exchanging security information with a decryption circuit under the control of a control circuit configured to monitor the interface transactions occurring on the internal data path.

In variant embodiments, the decryption circuit includes a simplified AES core configured to generate masks on the basis of the encryption parameters in the security information and hardware decryption circuitry to combine the decryption masks with the encrypted data, in particular including a circuit performing an exclusive OR, or XOR, operation, between the read data and the mask from the AES core.

In variant embodiments, the decryption circuit includes a bypass circuit to allow data which do not require the decryption, in particular the application data if the non-volatile memory is configured to store both the user application code image data and application data, to remain unchanged, in accordance with the commands being received from the control circuit on the control path.

In variant embodiments, the AES core is configured to perform an AES decryption calculating speculative decryption masks in advance to perform hardware decryption without adding latency.

It is also described a method to access encrypted data in a non-volatile memory from a device as described above, including fetching instructions stored encrypted in the non-volatile memory of the user application code image from the non-volatile memory and executing the instructions, further including performing a decryption on the fly of the instructions stored encrypted in the non-volatile memory.

In variant embodiments, the flow includes the following operations: first performing a system initialization; and then the microprocessor begins the execution of the decrypted instruction read from the flash memory, decrypted in read cycle by the decryption circuit.

In variant embodiments, the flow is an eXecution-In-Place (XIP) flow.

It is also described a computer program product that can be loaded into the memory of at least one computer and includes parts of software code that are able to execute the steps of the method above when the product is run on at least one computer.

BRIEF DESCRIPTION OF THE DRAWINGS

The invention will now be described purely by way of a non-limiting example with reference to the annexed drawings, in which:

FIG. 3 represents schematically a preferred embodiment of the solution here described;

DETAILED DESCRIPTION OF ILLUSTRATIVE EMBODIMENTS

The ensuing description illustrates various specific details aimed at an in-depth understanding of the embodiments. The embodiments may be implemented without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is meant to indicate that a particular configuration, structure, or characteristic described in relation to the embodiment is included in at least one embodiment. Likewise, phrases such as "in an embodiment" or "in one embodiment", that may be present in various points of the present description, do not necessarily refer to the one and the same embodiment. Furthermore, particular conformations, structures, or characteristics can be combined appropriately in one or more embodiments.

The references used herein are intended merely for convenience and hence do not define the sphere of protection or the scope of the embodiments.

Various embodiments may apply e.g. to an electronic device such as a Global Navigation Satellite System integrated circuit including a microprocessor based digital circuit and storing in the non-volatile memory a user application code image, the microcontroller being configured to operate according to a XIP execution flow-Place).

Various embodiments may apply e.g. to preferably an ARM-based microcontroller.

The solution here described refers to a decryption hardware circuit which avoids redesign of memory controllers by implementing an external decryption hardware circuit that can be connected to such controllers as a memory controller external add-on. Such decryption hardware circuit is able to decrypt an entire block of data on-the-fly by applying the decryption masks to the encrypted block of data. In order to address the flash zero-latency the decryption masks are generated in advance, with a masks speculation procedure.

The hardware circuit is configured to quickly generate the decryption masks for the current decryption burst and the speculative decryption masks for the next decryption burst, in order to decrypt a stream of data without adding further latency. Also the decryption hardware circuit provides protection of the decryption parameters (AES keys and vectors) used by the decryption circuit against "hacking", being configured so that the programming of the AES parameters occurs with a separate secure path with respect to the data path and the AES parameters read-back must be impossible. When the circuit is enabled to decrypt, it cannot be disabled anymore and the parameters are unchangeable. Therefore the circuit configured to perform a decryption includes registers which are accessible via a dedicated port, configured as both write-only and write-once.

Figure 1:
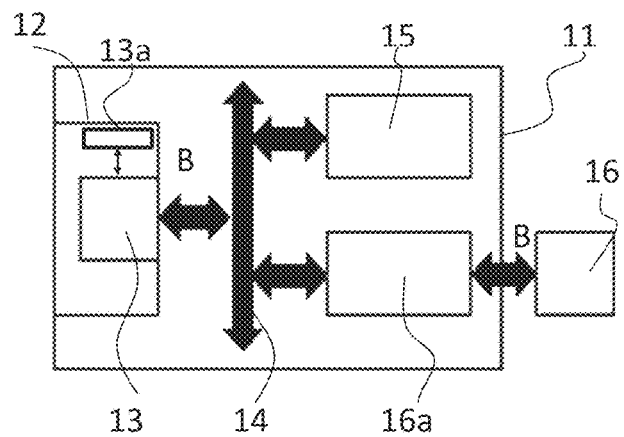
FIG. 1 was discussed in the foregoing.
Figure 2:
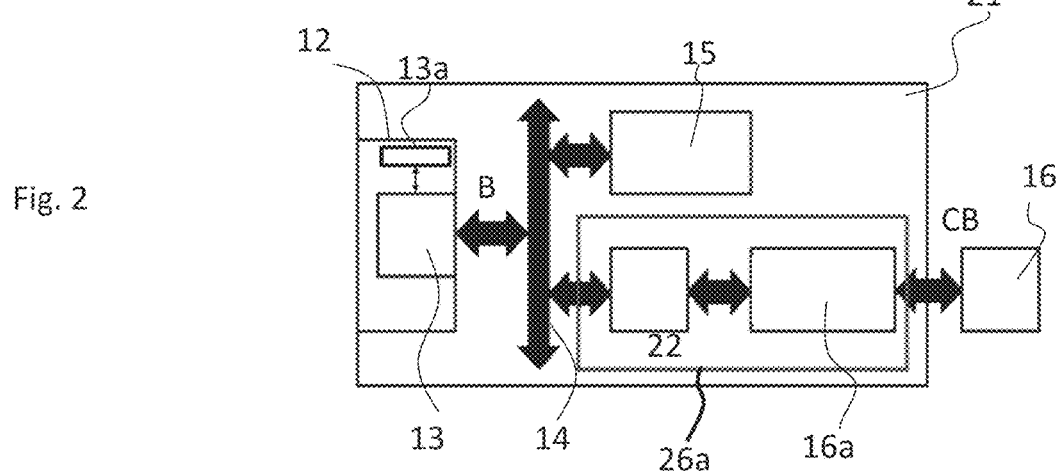
FIG. 2 represents schematically a first embodiment of the solution here described.

More in detail, with reference to FIG. 2, a schematic solution of a microcontroller 21 is described. The architecture is similar to the one of microcontroller 11 described with reference to FIG. 1, i.e. it includes the microprocessor 12 and cache memory 13 to access for reading and writing a RAM memory of the microcontroller 21, not shown in FIG. 2. The interconnect network 14, which can include a bus, allows exchanging data and signals, for instance block of data B, with the peripherals 15 and a non-volatile memory 26, specifically an external flash memory, which is accessed for writing and reading encrypted blocks CB through a secure memory controller 26a. Such secure memory controller 26a includes the decryption unaware memory controller 16a, which exchanges encrypted block of data CB with the non-volatile memory 16. However, placed between the controller 16 and the interconnect network 14, the secure memory controller 26a includes a decryption circuit 22, i.e. a circuit configured to perform a decryption on the fly, i.e. during the read cycle, of the blocks of data CB, in particular of instructions of the application code stored encrypted in the non-volatile memory 16. The decryption circuit 22 decrypts the encrypted blocks of data CB coming from the flash memory 16, through the memory controller 16a, and supplies them as decrypted block B over the interconnect network 14 to the microprocessor 12.

The decryption circuit 22 is configured to be part of the digital microcontroller subsystem, which has a limited internal memory, i.e. the RAM memory connected to the cache 13, a user application code image AC, containing instructions, being stored inside the non-volatile flash memory 16.

Preferably, the microcontroller 21 is configured to perform an eXecution-In-Place (XIP) procedure, which allows the microprocessor 12 to fetch and execute the instructions of the user application code image AC from the flash memory 16, instead of first copying them to the internal RAM memory 13 before their execution. The decryption circuit 22 allows performing the XIP procedure with an encrypted user application code AC, i.e. as encrypted blocks of data CB, to be performed without penalties to microprocessor performance.

Preferably the electronic device including the microcontroller 21 is a Global Navigation Satellite System integrated circuit, i.e. a positioning device, the microcontroller 21 being an ARM-based microcontroller. The application data stored in the flash memory 16 are or include positioning data, while the encrypted user application code image AC contains the instruction to manage the operations of the Global Navigation Satellite System integrated circuit.

An execution operation flows with encrypted application code includes the following steps: in a first step it is performed system initialization, e.g. a configuration of the hardware device; and in a second step the microprocessor 12 begins the execution of the decrypted code, i.e. instructions in blocks B, from the flash memory 16, because the code is decrypted on-the-fly, i.e. during the same read cycle, by the circuit 22.

This represents a far simpler and quicker procedure than the standard procedure which, after the system initialization, requires that the encrypted blocks CB of the application code AC are copied from the external flash memory 16 to the internal RAM memory 13a, then the microprocessor 12 decrypts the encrypted code and copy the decrypted code inside the internal memory 13a, then the microprocessor 12 begins the execution of the decrypted code from the RAM memory 13a.

The XIP procedure allows the microprocessor 12 to start the execution of the code faster than with the standard methodology and to design devices with less internal RAM memory. The XIP procedure also avoids that the decryption algorithm and decryption parameters are accessible.

FIG. 3 presents a preferred embodiment of the solution here described, which includes use of a security subsystem circuit, namely a Hardware Security Module, or HSM. State-of-the-art devices with microcontroller subsystems embed a security subsystem, i.e. the Hardware Security Module which is in charge of the management of the security. The HSM is a physical computing device that safeguards and manages digital keys for strong authentication and provides crypto-processing. As a separate result, the main microprocessor cannot access to the security information (encryption keys, encryption parameters) and security controls (i.e. it cannot disable the decryption).

To this regard in FIG. 3 is represented a microcontroller 31 which corresponds to the microcontroller 21, but, in addition, includes a Hardware Security Module 23. The Hardware Security Module 23 is connected to a security interconnect network 24 to exchange security information SD with the circuits of the microcontroller 30 and, in particular with the decryption circuit 22, specifically supplying encryption parameters to such decryption circuit 22.

Figure 6:
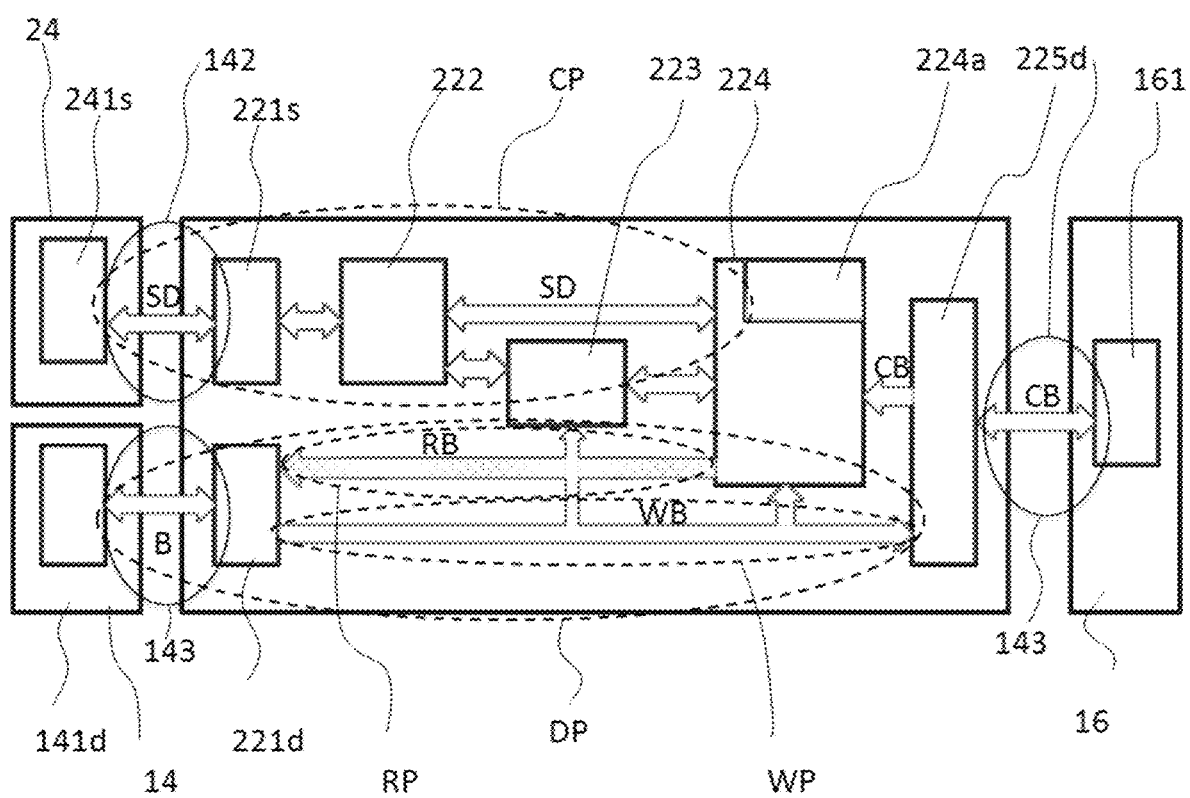
FIG. 6 represents schematically a circuit of the embodiment of FIG. 3.
Figure 7:
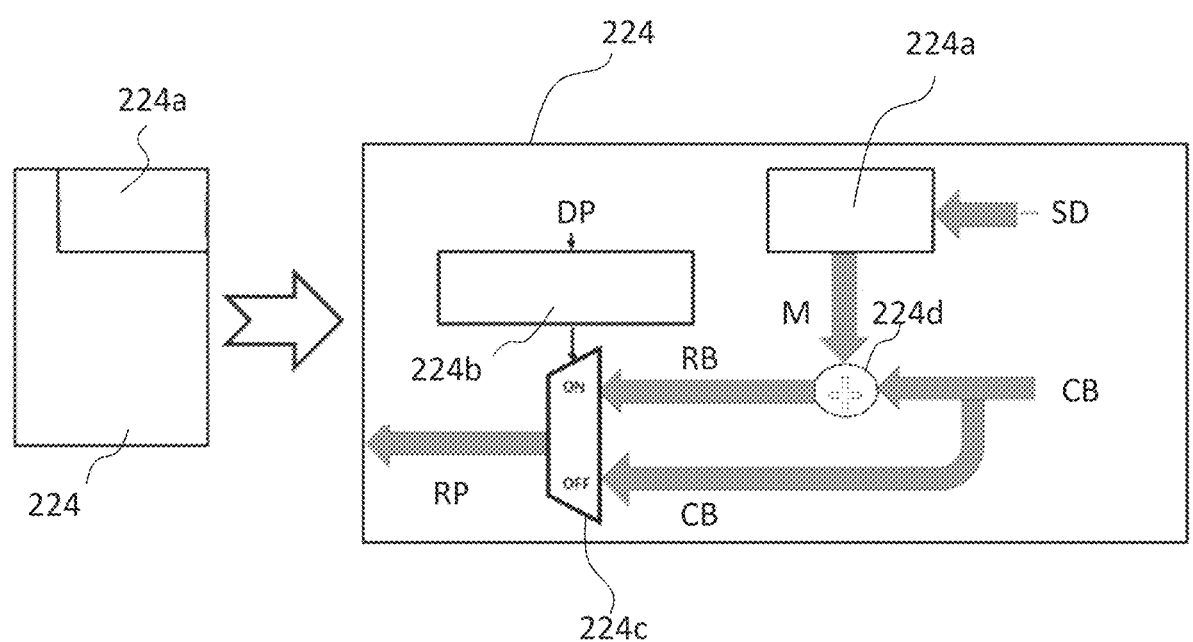
FIG. 7 represents schematically a sub-circuit of the circuit of FIG. 6.

The security information SD includes the decryption parameters, in particular the AES keys and vectors used by a decryption circuit 224, specifically an AES Core 224a, as shown in FIGS. 6 and 7, which must be protected against "hacking". The programming of the AES parameters in the decryption circuit 224 occurs through a separate secure path, i.e. the secure interconnection network 24, with respect to the data path, represented by the interconnect network 14, and the AES parameters readback is thus made impossible. When the decryption circuit 22 is enabled to decrypt it cannot be disabled anymore and the parameters are be unchangeable. The registers of the decryption circuit 22, as better shown with reference to FIG. 7, which are accessible only via a dedicated port, both write-only and write-once.

To this regard, in FIG. 6 is shown a schematic of the decryption circuit 22.

A secure path interface 221s interfaces the circuit 22 with the secure interconnect network 24 to exchange the security information SD. A corresponding interface 241s is provided on the secure interconnect network 24.

A data path interface 221d interfaces the decryption circuit 22 with the interconnect network 14 to exchange the data, for instance the block of data B. A corresponding interface 141d is provided on the interconnect network 14.

From the secure path interface 221s start an internal secure data path, labeled as control path CP, for the secure information SD, in the decryption circuit 22, while from the data path interface 221d starts an internal data path DP for the data to be written WB and data to be read RB.

On the control path CP are arranged registers 222 to store the AES parameters being used for the decryption in the security information SD, in particular the encryption keys and parameters for the AES core 224a which performs the AES decryption are provided. A control circuit 223 is configured to monitor the interface transactions occurring on the data path DP, recognize the transactions to be decrypted and send commands to the decryption circuit 224 accordingly.

The decryption circuit 224, as better shown in FIG. 7, is a circuit embedding the AES core 224a for the decryption masks generation, the hardware decryption circuitry to combine the decryption masks with the encrypted data and a bypass circuit to allow the data which do not require the decryption, for instance the application code, to remain unchanged, in accordance with the commands being received from the control circuit 223.

The decryption circuit 224 receives the encrypted read data in the encrypted blocks CB from the flash memory 16 through a data path interface 225d arranged in the decryption circuit 22 and a corresponding data interface 161 in the non-volatile memory 16.

The internal data path DP includes a write path WP which sends the write data WB directly to the data path interface 225d and then to the non-volatile memory 16 for writing operations. These write data WB can be encrypted by the microcontroller 31 or by another device associated to the microcontroller 31. The internal data path DP includes also a read path RP, which starts from the non-volatile memory 16, passes through the decryption circuit 22 (through interfaces 225d and 161) and reaches, after undergoing decryption at decryption circuit 224, as read blocks RB, the data path interfaces 221d and 141d to be propagated on the interconnect network 14 to the microprocessor 12, for instance for execution according to the XIP procedure.

The decryption circuit 22 has compatible interfaces to be connected to the existing interconnect interfaces, which are specifically ARM Advanced Peripheral Bus (APB) 142 (the secure path interfaces 141a, 221s) and memory controller interfaces Advanced High-performance Bus (AHB) 143 (the data path interfaces, 141d, 221d and 225d, 161).

As mentioned, the decryption circuit 22 provides a control path CP, which is a secure path including circuits 221S, 222, 223, 224, being separated from the data path DP (circuits 211d, 225d). The AES parameters and control commands can be programmed into registers 222, which are write-only and write-once, via the secure path SP to prevent against hacking.

In FIG. 7 it is shown a block schematics detailing the decryption circuit 224. Such decryption circuit 224 as mentioned includes the AES core 224a, which receives the secure information SD, namely the AES key, the AES Initialization Vector and the address of the data to decrypt, generating the corresponding decryption masks M (and also speculative masks SM).

The speculative masks SM are calculated by way of a speculative procedure, in which, for instance, the mask generated depends on the address of the block of data. When the main processor (via its cache controller) issues a read to the memory, the decryption circuit 224 starts generating the decryption mask M. As soon as the mask M is generated, the decryption circuit 224 speculatively generates the mask SM for the block being at the next consecutive linear address, i.e. speculates that the block at the next consecutive linear address is the next block that will be read. Hence, if the cache performs a read to this block, the speculated mask SM is already available. As a state-of the-art flash memory introduces a latency only on the first block read, but none for the following linear blocks, this solution avoids the decryption block to add some latency on decryption of subsequent block read.

The AES core 224a is preferably a specialized version of a general-purpose AES core in order to just generate the decryption masks M, so that such specialized AES core 224a can be faster, enhancing the decryption speed, and use less resources, i.e. less area on the chip than the general purpose AES core.

For instance the AES core 224 receives the AHB address of the data to decrypt (32 bits) and the AES Initialization Vector (128 bit), which are summed one with the other, and on a separate input, the AES key (128 bits), which are then used by the AES Core 224a in way per se known to obtain the mask M.

Such decryption masks M, SM are supplied to a block 224d performing an exclusive or, or XOR, operation with the corresponding data read from the flash memory 16. These read data are in general encrypted data CB, however they may also be not encrypted data, although in FIG. 7 for simplicity all these data are indicated with the reference CB. For this reason, decrypted data from the XOR block 224d are sent to an input of a multiplexer 224C while the data read from the memory 16 are also sent directly to another input of the multiplexer 224c.

The hardware XOR operation at block 224d of the decryption mask M (or speculative mask SM) with data CB read from the flash memory 16 occurs without adding delay (latency) to the decrypted data. A decryption monitor circuit 224b is configured to determine if the data CB from the flash memory 16 must be decrypted, because it is a block of code image data or not, controlling correspondingly the outputs of the multiplexer 224c. The decryption monitor circuit 224b monitors the transaction type and the address range, by reading the internal data path DP.

Figure 8:
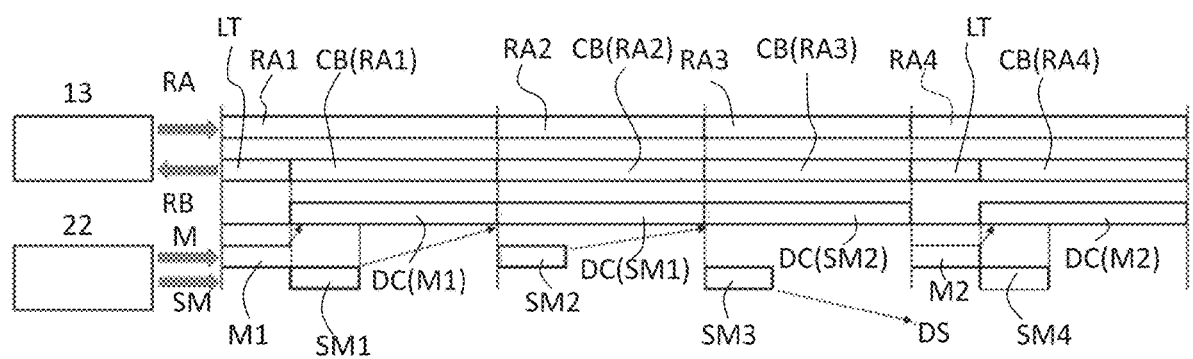
FIG. 8 represents a flow of operations performed by the solution here described.

In FIG. 8 it is shown a diagram representing access operations for reading the memory 16 by the microprocessor 12, represented through the cache memory 13.

The first row in the diagram represents the reading addresses RA sent in sequence by the microprocessor 12 to access the memory 16. As a first read is sent a read address RA1 (first column, columns represents subsequent read cycles, or decryption bursts). The memory 16 supplies the corresponding block of data CB(RA1) with a latency LT, as shown in the second row, representing the response of memory 16. Operations of the decryption circuit 22 are shown in the third row (data decryption), fourth row (both mask and speculative mask generation), and fifth row (speculative mask generation only). The decryption circuit 22 generates (fifth row) a decryption mask M1 and generates then a speculative mask SM1 therefrom, generating the mask corresponding to the next estimated read address, specifically the next consecutive linear address. A decryption operation DC(M1) with the first decryption mask M1, which corresponds to performing a XOR between the mask M1 and the block of data CB(RA1), is performed, originating the corresponding decrypted read block RB sent to the cache 13. The second column shows a consecutive read, address is RA2=RA1+1, the block of data obtained is CB(RA2), which is decrypted by operation DC(SM1) using the speculative mask SM1 generated at the previous read cycle. A second speculative mask SM2 is also generated. Then, in the next read cycle (third column), a further consecutive read is performed, address is RA3=RA2+1, the block of data obtained is CB(RA3), which is decrypted by operation DC(SM2) using the second speculative mask SM2 derived at the previous read cycle. A third speculative mask SM3 is also obtained during this cycle. Then, in the next and final read cycle, a non-consecutive read is performed, i.e. the read address in incremented by five, is RA4=RA3+5. This means that the third speculative mask SM3 cannot be used, thus the third speculative mask SM3 is disposed (operation DS). The memory 16 supplies the corresponding block of data CB(RA4) with a latency LT, as shown in the third row, representing the response of memory 16. The decryption circuit 22 generates a second decryption mask M2 and derives then a fourth speculative mask SM4 therefrom. A decryption operation DC(M4) with the second decryption mask M2 is performed.

This shows how the flash zero-latency reads require the decryption masks to be generated in advance (masks speculation) and how a specialized hardware circuitry is required to quickly generate the decryption masks M for the current decryption burst and the speculative decryption masks for the next decryption burst, in order to decrypt a stream of data without adding further latency. The AES core is a simplified core specialized in order to generate the 128 bit decryption mask as fast as possible, with the lowest hardware resources. The AES core is configured to generate a decryption mask in only 11 clock cycles.

The AES core can be used mostly in two ways—as a block cipher (that is data are encrypted/decrypted by the AES core) or as a stream cipher (the AES core is used to generate a mask that is XORed with data, i.e. an exclusive OR is performed between the mask and the data). The drawback of the block cipher mode is that it is possible to start using the AES core only when the data is available. Thus, it is taken in consideration the full latency of AES processing. With stream cipher, the mask generation is independent of data availability and can usually be started in advance. Hence, part or all the AES latency can be removed.

Under this view, the simplified AES core is configured to only implement encryption as the same mask is used for encryption and decryption. For encryption, clear text, i.e. data, is XORed with a mask, obtaining cyphered text. In decryption, such cipher text is XORed with the same mask which provides the clear text.

Summarizing the simplified AES core 224a is configured to operate only in encryption mode and the decryption circuit 224 is configured to use the simplified AES core 224a only as a stream cipher, generating decryption masks M, SM, which are supplied to block 224d to perform an exclusive or, or XOR, operation with the corresponding data read from the flash memory 16. The decryption masks M, SM are the same used to encrypt the data read from the flash memory 16.

Figure 4:
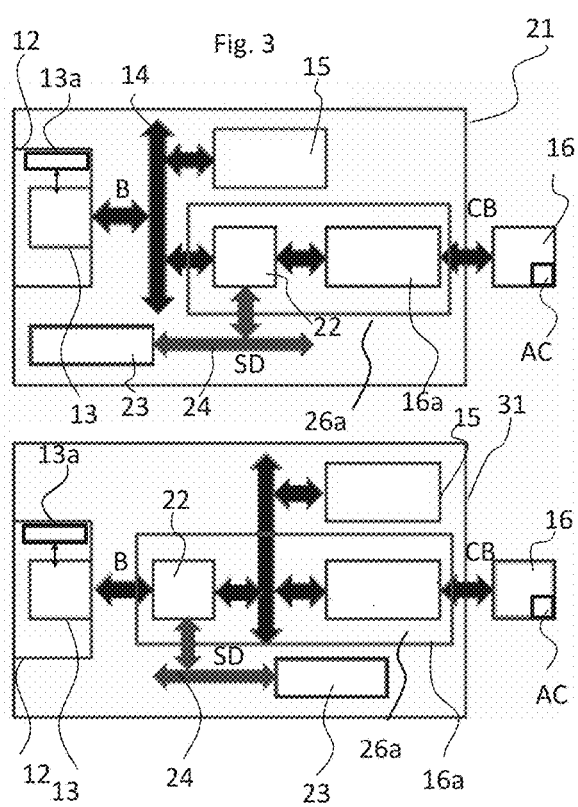
FIG. 4 represents schematically a further embodiment of the solution here described.
Figure 5:
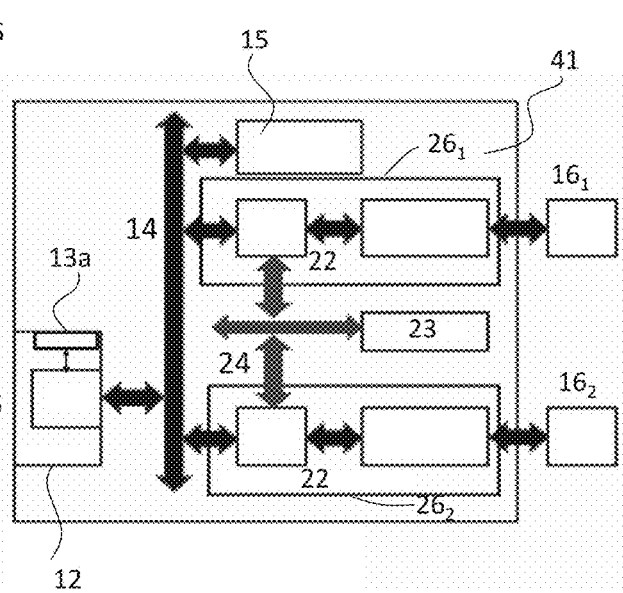
FIG. 5 represents schematically another further embodiment of the solution here described.

FIGS. 4 and 5 show two variant embodiments. In FIG. 4 the decryption circuit 22 is connected directly to the processor 12, i.e. between the processor 12 and the interconnect network 14, so that only the data to the processor 12 are decrypted, while there are no decrypted data on the interconnect network 14.

In FIG. 5 it is shown an embodiment with more than one non-volatile memory 16, in particular two memories $16_1$ and $16_2$ that the processor 12 can access. In this case are provided two secure controllers $26_1$ and $26_2$, one for each non-volatile memory, which are connected to the interconnect network 14. A unique Hardware Security Module 23 is provided which supplies the security information SD on the secure interconnect network to the two secure controllers $26_1$ and $26_2$ in parallel.

The solution according to the various embodiments here described allows to obtain the following advantages.

This solution advantageously provides that the hardware decryption is performed without adding latency, in particular by providing speculative decryption masks.

Also, a simplified hardware to generate decryption masks without the intervention of the microprocessor is used by employing an optimized AES core.

The solution described provides a flexible architectural topology and easy design integration.

The solution described provides separate paths for application code data and secure data.

The solution described provides decryption of application code and transparency with application data.

Of course, without prejudice to the principle of the embodiments, the details of construction and the embodiments may vary widely with respect to what has been described and illustrated herein purely by way of example, without thereby departing from the scope of the present embodiments.

The depicted implementation is designed specifically for an ARM-based microcontroller subsystem, but it can be generalized according to different architectures (and interfaces) and caches (different size of block of data).

The encryption process of the data stored in the flash memory preferably is an off-line software flow using a computer to program the flash memory with the encrypted code image by using a flash loader application. In variant embodiments first the source code is compiled, for instance in an external computer, as code image, then the code image, by the same or another computer, is encrypted using a AES algorithm making use of the AES key, the AES Initialization Vector and the range address of the data to encrypt, obtaining the encrypted code image AC, which is then stored in the flash memory with the flash loader application.

In variant embodiments an encryption process different from AES can be used.

The electronic device including the decryption circuit here described is particularly efficient in performing a decryption on-the-fly of the code image stored inside a non-volatile memory without penalty (no latency, no microprocessor intervention, . . . ) in a XIP scenario, however it does not need to recognize a XIP flow to operate. The electronic device including the decryption circuit here described recognizes the typical read transactions performed by the cache during the cache linefills. Therefore the electronic device including the decryption circuit here described can be used to access in general a non-volatile memory storing encrypted data which are preferably read-only data. These read-only data can include application code image, but in variant embodiments can be also different kinds of data, for instance constant data. A DMA (Direct Memory Access) device is then able to perform read transactions like the cache ones, i.e. it can represent a circuit to access the non-volatile memory. When the DMA performs "cache-like" read transactions to the decryption circuit, the data are decrypted as well. In general the decryption circuit can decrypt on the fly encrypted information (code or data) when triggered by specific read transactions.

What is claimed is:

1. An electronic device, comprising:
    a non-volatile memory configured to store data, wherein the data comprises encrypted data; and
    a digital circuit, comprising:
        a microprocessor configured to access the non-volatile memory and an internal memory; and
        a decryption circuit arranged on an interconnect network identifying an internal data path for exchanging the data between the non-volatile memory and the microprocessor, and connected to a memory controller of the non-volatile memory for receiving blocks of data from the non-volatile memory, the decryption circuit being configured to:
            perform a decryption, on the fly, of blocks of the data read from the non-volatile memory to obtain read decrypted data;
            generate first decryption masks corresponding to first blocks of data being read from the non-volatile memory at a given read address; and
            generate second decryption masks corresponding to second blocks of data to be read from the non-volatile memory at a next estimated read address, wherein the decryption circuit comprises a bypass circuit to allow data which do not require decryption to remain unchanged in accordance with commands being received from a control circuit configured to monitor transactions occurring on an internal control path.

2. The device according to claim 1, wherein the internal memory comprises a random-access memory.

3. The device according to claim 1, wherein the data comprises read-only data.

4. The device according to claim 1, wherein the non-volatile memory comprises a flash memory.

5. The device according to claim 1, wherein the microprocessor comprises a digital microcontroller, wherein the data comprises a user application code image, wherein the digital microcontroller is configured to:
    operate according to an execution flow comprising an eXecution-In-Place (XIP) flow;
    fetch instructions of the user application code image from the non-volatile memory, wherein the instructions of the user application code image are stored encrypted in the non-volatile memory; and
    execute the instructions of the user application code image.

6. The device according to claim 5, wherein the digital microcontroller comprises a security subsystem circuit connected to a security interconnect network identifying a secure data path to exchange security information including encryption parameters with the digital microcontroller, the decryption circuit also being connected to the security subsystem circuit.

7. The device according to claim 6, wherein the security subsystem circuit comprises a Hardware Security Module.

8. The device according to claim 6, wherein the decryption circuit comprises the internal control path for exchanging the security information with an internal decryption circuit, separated from the internal data path.

9. The device according to claim 8, wherein the internal control path comprises at least one register connected through at least one interface to the security interconnect network, the at least one register being accessible via a dedicated port to which the security subsystem circuit is connected through the security interconnect network to manage a security of the data transiting on the dedicated port, the at least one register being a write-only and a write-once register, the at least one register being configured to exchange security information with the decryption circuit under control of a control circuit configured to monitor transactions occurring on the internal data path.

10. The device according to claim 9, wherein the decryption circuit comprises an Advanced Encryption Standard (AES) decryption circuit comprising a simplified AES core configured to generate the first decryption masks and the second decryption masks on a basis of the encryption parameters in the security information and a hardware decryption circuitry to combine the first decryption masks and the second decryption masks with the encrypted data, the hardware decryption circuitry comprising a circuit performing an exclusive OR operation between the data and the first decryption masks or the second decryption masks supplied from the simplified AES core.

11. The device according to claim 10, wherein the simplified AES core is configured to operate only in encryption mode, and wherein the decryption circuit is configured to use the simplified AES core as a stream cipher to generate a mask supplied to the circuit of the hardware decryption circuitry.

12. The device according to claim 11, wherein the simplified AES core is configured to perform an AES decryption calculating speculative decryption masks corresponding to the second blocks of data read, wherein the next estimated read address corresponds to a next consecutive linear address to perform hardware decryption without adding latency.

13. The device according to claim 1, wherein the device is a Global Navigation Satellite System integrated circuit.

14. A method to access encrypted data in a non-volatile memory, the method comprising:
    fetching instructions of a user application code image from a non-volatile memory, the user application code image being encrypted and stored in the non-volatile memory;
    executing the instructions of the user application code image;
    performing, by a decryption circuit, a decryption, on the fly, of the instructions of the user application code image encrypted and stored in the non-volatile memory; and
    generating first decryption masks corresponding to first blocks of data being read from the non-volatile memory at a given read address; and
    generating second decryption masks corresponding to second blocks of data to be read from the non-volatile memory at a next estimated read address, wherein the next estimated read address comprises a next consecutive linear read address.

15. The method according to claim 14, further comprising:
    performing a system initialization; and
    executing, by a microprocessor, decrypted instruction read from the non-volatile memory, decrypted in a read cycle by the decryption circuit.

16. The method according to claim 15, wherein steps of the method comprise an eXecution-In-Place flow.

17. The method according to claim 14, further comprising:
allowing data which do not require decryption to remain unchanged in accordance with commands received from a control circuit configured to monitor transactions occurring on an internal control path.

18. A non-transitory computer-readable storage medium storing a program to be executed by a processor, the program including instructions for:
fetching instructions of a user application code image from a non-volatile memory, the user application code image being encrypted and stored in the non-volatile memory;
executing the instructions of the user application code image;
performing, by a decryption circuit, a decryption, on the fly, of the instructions of the user application code image encrypted and stored in the non-volatile memory;
generating first decryption masks corresponding to first blocks of data being read from the non-volatile memory at a given read address; and
generating second decryption masks corresponding to second blocks of data to be read from the non-volatile memory at a next estimated read address, wherein the next estimated read address comprises a next consecutive linear read address.

19. The non-transitory computer-readable storage medium according to claim 18, wherein the program further includes instruction for:
allowing data which do not require decryption to remain unchanged in accordance with commands received from a control circuit configured to monitor transactions occurring on an internal control path.

20. An electronic device, comprising:
a microprocessor having an internal memory and configured to access a non-volatile memory that is configured to store encrypted data comprising an user application code image;
a bus identifying an internal data path for exchanging the encrypted data between the non-volatile memory and the microprocessor;
a memory controller of the non-volatile memory for receiving blocks of data from the non-volatile memory;
a decryption circuit arranged on the internal data path between the memory controller and the microprocessor, and configured to decrypt the encrypted data on the fly, the decryption circuit being configured to:
perform a decryption, on the fly, of blocks of the data read from the non-volatile memory to obtain read decrypted data; and
supply the decrypted blocks of the data over the bus to the microprocessor, wherein the decryption circuit is external to the microprocessor as part of a microcontroller subsystem, wherein the decryption circuit comprises a bypass circuit to allow data which do not require decryption to remain unchanged in accordance with commands being received from a control circuit configured to monitor transactions occurring on an internal control path.

21. The device according to claim 20, wherein the decryption circuit is further configured to:
generate first decryption masks corresponding to first blocks of data being read from the non-volatile memory at a given read address; and
generate second decryption masks corresponding to second blocks of data to be read from the non-volatile memory at a next estimated read address.

22. The device according to claim 21, wherein the decryption circuit comprises an Advanced Encryption Standard (AES) decryption circuit comprising a simplified AES core configured to generate the first decryption masks and the second decryption masks on a basis of encryption parameters in security information and a hardware decryption circuitry to combine the first decryption masks and the second decryption masks with the encrypted data, the hardware decryption circuitry comprising a circuit performing an exclusive OR operation between the data and the first decryption masks or the second decryption masks supplied from the simplified AES core.

* * * * *